United States Patent
Chiu et al.

(10) Patent No.: US 7,096,251 B2
(45) Date of Patent: Aug. 22, 2006

(54) CALCULATION OF LAYERED ROUTES IN A DISTRIBUTED MANNER

(75) Inventors: Dah Ming Chiu, Acton, MA (US); Miriam C. Kadansky, Westford, MA (US); Radia J. Perlman, Carlisle, MA (US); Murat Yuksel, Troy, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 774 days.

(21) Appl. No.: 10/209,077

(22) Filed: Jul. 31, 2002

(65) Prior Publication Data
US 2003/0140165 A1    Jul. 24, 2003

Related U.S. Application Data

(60) Provisional application No. 60/350,884, filed on Jan. 23, 2002.

(51) Int. Cl.
*G06F 15/16* (2006.01)
(52) U.S. Cl. ............... 709/202; 709/238; 709/242; 370/228; 370/238; 370/466
(58) Field of Classification Search ............... 709/202, 709/238, 242, 244
See application file for complete search history.

(56) References Cited

U.S. PATENT DOCUMENTS

| | | | |
|---|---|---|---|
| 5,793,765 A * | 8/1998 | Boer et al. ............... 370/400 |
| 6,584,102 B1 * | 6/2003 | Lu ............... 370/389 |
| 6,611,532 B1 * | 8/2003 | Madour et al. ............... 370/466 |
| 6,678,241 B1 * | 1/2004 | Gai et al. ............... 370/216 |
| 6,694,256 B1 * | 2/2004 | Childs et al. ............... 701/209 |
| 6,785,277 B1 * | 8/2004 | Sundling et al. ............... 370/392 |
| 6,788,650 B1 * | 9/2004 | Chen et al. ............... 370/254 |
| 6,836,465 B1 * | 12/2004 | Rajan et al. ............... 370/238 |
| 6,917,983 B1 * | 7/2005 | Li ............... 709/238 |
| 2003/0043756 A1 * | 3/2003 | Reynders et al. ............... 370/254 |

OTHER PUBLICATIONS

"Routing in Data Networks" Chapter 5, pp. 396-400.

* cited by examiner

*Primary Examiner*—Zarni Maung
*Assistant Examiner*—Van Nguyen
(74) *Attorney, Agent, or Firm*—Kudirka & Jobse, LLP

(57) ABSTRACT

A distributed system and method generate "layered routes" that reflect a layered representation of a network, which representation provides deadlock-free routes. The layered representation consists of an ordered set of layers, where each layer is a deadlock-free sub-topology of the network. In determining routes, the links used in each route are constrained to be taken from layers of non-decreasing order as the route extends from source to destination. A device that determines a better or equal cost path to a destination node with respect to its current path to that node sends a route information message to its neighbor devices. The receiver of a route information message may then accept the message and begin using the new path described by the message, or reject the message without using the new path.

28 Claims, 12 Drawing Sheets

| DESTINATION NODE 40 | DISTANCE 42 | LAYER ID 44 |

ROUTE INFORMATION MESSAGE 36

*Fig. 2*

CALCULATION OF LAYERED ROUTES IN A DISTRIBUTED MANNER

CROSS REFERENCE TO RELATED APPLICATIONS

This application claims priority under 35 U.S.C. §119(e) to provisional patent application Ser. No. 60/350,884 filed Jan. 23, 2002.

STATEMENT REGARDING FEDERALLY SPONSORED RESEARCH OR DEVELOPMENT

N/A

BACKGROUND OF THE INVENTION

The present invention relates generally to routing data through a communication network, and more specifically to a system for calculating layered routes in a distributed manner.

In communication systems such as computer networks, routing is the process of determining the network links over which data, such as a packet or other type of data unit, is forwarded on its way through the network. Routing is performed by various kinds of data forwarding devices, sometimes referred to as routers and/or switches. A forwarding device that performs routing is typically connected to multiple communication links, and operates to select at least one of those communication links as an output link for each received data unit to be forwarded. The link or links over which data units are forwarded from one device to another is referred to as a "route" through a network. As it is generally known, network devices, including both forwarding devices and end stations, are referred to as the "nodes" of a network.

In various contexts, such as high speed networks using hop-by-hop flow control, or where cut-through routing is used, network operation using a given set of routes may create what is known as a "deadlock" condition. For example, deadlock can occur within a group of switches, each of which has buffers full of data, and cannot drop any packet from those buffers. Each of the switches in the group may be unable to forward its received data because the next switch to which the data must be forwarded also has no available buffers in which to store the data.

A number of existing systems have been developed to find deadlock-free sets of routes between all pairs of nodes in arbitrary network topologies. Examples of such existing systems have either constrained the topology of the network itself, and/or constrained the routes which may be taken through the network. For example, the topology of a network may be constrained such that the devices in the network are arranged as a grid. Given a grid topology, if all routes through the network are required to first traverse links horizontally as far as necessary, then vertically to the destination node, the network will be deadlock-free. Similarly, if a network topology is constrained to be a tree, which by definition includes no loops, that network will also be deadlock-free.

A well known approach to determining a deadlock-free set of routes through an arbitrary network topology is "up/down routing." In up/down routing, one forwarding device in the network is chosen as the root node of a spanning tree for the network. All links within the network are then designated as "up" or "down" links with respect to the root node. The determination of an "up" or "down" state for a given link is based on the position of the link within the spanning tree. A link is "up" if it points from a lower to a higher level node in the tree. Otherwise, the link is considered a "down" link. For nodes at the same level, node IDs are used to break the tie. Routing of packets is performed such that any "up" links (towards the root) in the route are traversed before any "down" links are traversed (away from the root node) in order to reach the destination. Accordingly, once a "down" link has been traversed, no "up" links may subsequently be used within a route.

In many existing systems, a complete topology of the network is collected at a central node, and used to calculate a deadlock-free set of routes for the whole network. The deadlock-free set of routes is then used to generate a routing table at the central node, containing routing information that describes the set of routes. Once computed, the routing information in the routing table is distributed from the central system as forwarding tables to all other forwarding devices in the network, thus informing each forwarding device of the neighbor device to which each received data unit is to be forwarded, based on the destination of the received data unit.

A centralized approach to route generation is advantageous in that it allows a high degree of optimization, based on a global view of the network obtained by the central node. However, centralized generation of routes often does not scale well to large networks having many links and nodes. As the size of the network increases, so does the time required to obtain information at the central node, and the time required to distribute the generated routes throughout the network from the central node. Consequently, the time required to centrally generate and distribute a new set of routes for a very large network may be prohibitive for time-sensitive applications.

For these reasons it would be desirable to have a system for determining and providing routing information to devices in a network that does not require centralized route generation or distribution of routes from a central node. The system should provide routes that are deadlock-free, and that reflect some degree of cost optimization.

BRIEF SUMMARY OF THE INVENTION

In accordance with the present invention, a distributed system and method for generating layered routes is disclosed. The layered routes generated by the disclosed system are based on a layered representation of the network. By using the layered representation of the network, the disclosed system provides a set of deadlock-free routes. The layered representation consists of an ordered set of layers, where each layer is a deadlock-free sub-topology of the network. Each deadlock-free sub-topology is a sub-graph of the network including a subset of the nodes and links of the network, such that every link in the sub-graph connects two nodes of the sub-graph. The links associated with a given layer need not provide a path between every pair of nodes in its sub-topology.

In determining a route using links from different layers, the disclosed system selects links from layers of non-decreasing order, as the route extends from a source to a destination. This constraint is referred to herein as the "layered rule", and a route that obeys this rule is accordingly referred to herein as a "layered route". The disclosed system operates in a distributed manner to form routes obeying the layered rule.

After the layered representation of the network is determined, each device in the network is informed of, or actively determines, the layer numbers associated with its outgoing links. When a network device determines a better or equal cost route to a destination node with respect to a currently stored route to that node, the device sends a route information message to its neighbor devices. The route information message identifies the sending device, the destination device reachable over the new route, and the layer number associated with the first link toward the destination device from the device sending the route information message. A cost associated with forwarding data to the destination device through the new route, for example in terms of hops or some other cost metric, may also be included in the route information message.

In an embodiment where multiple alternative routes may be stored in each forwarding device, a route constrain message is sent in response to a route information message in the event that the new route described by the route information message is accepted by a receiver of the route information message. Each route constrain message indicates a destination node and a layer number. When a node receives a route constrain message, it marks as "unusable" any routes to the destination node indicated by the route constrain message, and that start with a link in a layer lower than the layer number indicated by the route constrain message. A route may be marked as unusable, for example, by setting an "unusable bit" associated with the route. Additionally, each unusable bit is associated with an unusable list. The unusable list stores the identities of all nodes that have sent route constrain messages that would result in the associated unusable bit being set. Thus, the route constrain message can be used to ensure that when a new route is adopted, no alternative routes are used that would break the layered rule. When a route is no longer to be used, then previously unusable routes can again be used. For example, a route unconstrain message may be used to remove the "unusable" indication from those paths marked as such in response to a previous route constrain message.

In an alternative embodiment, the layered representation of the network generated at step 60 is provided to a predetermined node that is responsible for generating and distributing routes for the whole network. In such an alternative embodiment, the disclosed system performs step 62 for each node in the network, and puts all Route Information messages generated at step 62 into a processing queue. Further in this alternative embodiment, at step 64, the disclosed system dequeues messages from the processing queue. Similarly, subsequent messages are put onto the processing queue for later processing. When all messages have been processed, the alternative embodiment then distributes the generated routes to the nodes of the network, for example in the form of forwarding tables.

Thus there is provided a distributed system for providing routing information that results in no deadlock conditions. The distributed nature of the present system is advantageous over centralized approaches in that each node in the network generates routes based on information it obtains locally, without the need to centrally aggregate information from across the entire network. Moreover, the failure of one or more nodes or links is unlikely to compromise the operation of the disclosed system.

BRIEF DESCRIPTION OF THE SEVERAL VIEWS OF THE DRAWING

The invention will be more fully understood by reference to the following detailed description of the invention in conjunction with the drawings, of which:

FIG. 2 shows an illustrative format for a route information message;

DETAILED DESCRIPTION OF THE INVENTION

U.S. provisional patent application No. 60/350,884, filed Jan. 23, 2002, and entitled "Calculation of Layered Routes in a Distributed Manner," is incorporated herein by reference.

Figure 1:
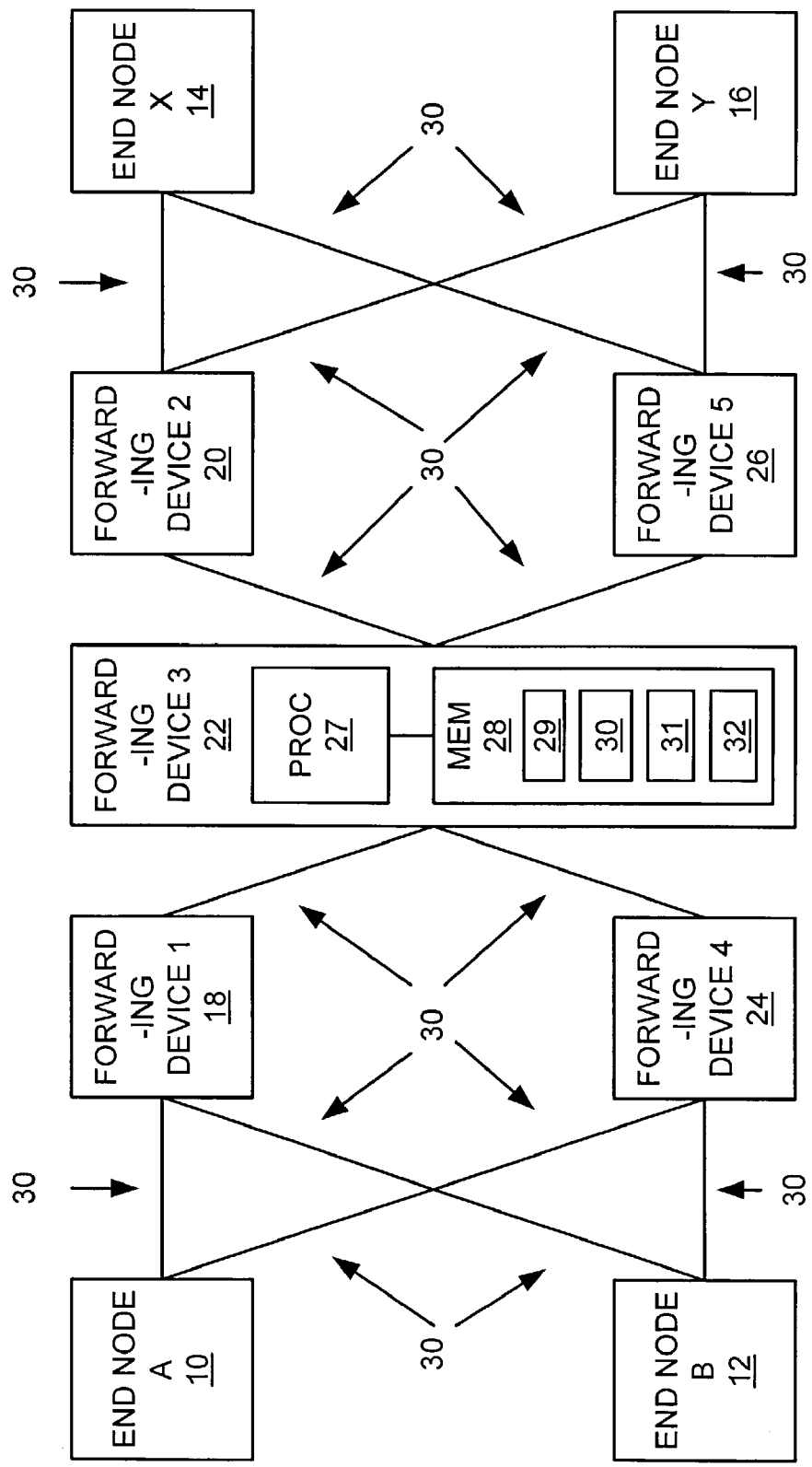
FIG. 1 shows an illustrative network of devices for which routes are provided by an embodiment of the disclosed system.

The disclosed system generates routing information for a network of devices, such as the network of devices shown in FIG. 1. FIG. 1 shows a communication network including a number of end stations, shown as end station A 10, end station B 12, end station X 14, and end station Y 16. The end stations in FIG. 1 communicate with one another through a number of forwarding devices, such as switches, shown as forwarding device 1 18, forwarding device 2 20, forwarding device 3 22, forwarding device 4 24, and forwarding device 5 26. The links interconnecting the devices shown in FIG. 1 may consist of any type of communications channel, including electrically conductive, fiber optic or wireless channels. Each of the devices shown in FIG. 1, including both end stations and forwarding devices, is a node of the network shown in FIG. 1, and may include one or more processors for executing program code stored within a program code memory, and/or hardware logic providing specific functionality.

The disclosed system partitions the links of a network into a set of ordered layers. The links of the network are considered as unidirectional links for purposes of layering. Accordingly, bi-directional links are treated as pairs of uni-directional links for purposes of partitioning the network into layers, and for generating the layered routes. Each node in the network determines, or is informed of, the layer number associated with each of its outgoing links. For example, a link layer table L may be used by each forwarding device to store the layer numbers of links attached to it. Thus, for a given forwarding device node i, link layer table entry L_ij would store the layer number of a unidirectional link from node i to node j. In a network in which all links are bi-directional, node i would accordingly store layer numbers in link layer table entries L_ik and L_ki, for values of k that identify all neighbor nodes with respect to the device i. Neighbor nodes of a node i are considered to be those nodes that are reachable over a single link from node i. Layer number information for outgoing links of a given node can be obtained by that node from another node having information describing the set of layers describing the network using any conventional distribution mechanism. Moreover, if a given node has information regarding the layer numbers for its outgoing links only, that node may optionally also determine the layer numbers of its incoming links by polling its neighbor nodes. Each of the forwarding devices in FIG. 1 further includes a forwarding table and a distance vector. The forwarding table for a forwarding device includes an entry associated with each other node in the network. After the disclosed system completes its route generation process, the network begins normal operation. During normal operation, when a data unit is received, such as a packet, a forwarding device examines its forwarding table to determine an entry associated with a destination address in the data unit. The forwarding table entry so determined includes an indication of at least one outgoing link onto which the received data unit should be forwarded.

The distance vector in a forwarding device also includes an entry for each other node in the network. An entry in the distance vector associated with a given node indicates the cost, for example in hops, of reaching that node using a currently defined route. In the case where multiple alternative routes are stored in association with a given destination, the entry in the distance vector may include multiple values, each of which is associated with one of the alternative routes. For purposes of illustration, the forwarding device 22 is shown including a processor 27 and a memory 28. The memory 28 of the forwarding device 22 is further shown including a forwarding table 29, a distance vector 30, a link number table 31, and a number of unusable lists 32.

In an alternative embodiment in which the disclosed system operates at a single predetermined node to generate layered routes for the complete network, the memory 28 may further be used to store a processing queue of messages. In such an alternative embodiment, the disclosed system places the messages that are generated during operation onto the processing queue. Messages are then processed as they are dequeued from the processing queue.

In order to determine routes in a distributed manner, the disclosed system employs a route information message, such as the Route Information message 36 shown in FIG. 2. The Route Information message 36 of FIG. 2 includes a Destination Node field 40, a Distance field 42, and a Layer ID field 44. The purpose of the Route Information message 36 is to indicate that there is a route available from the device that sent the message to a device identified by the Destination Node field 38 The contents of the Destination Node field 38 may identify a device by an address of that device, such as the address that would be stored in the destination address field of a message transmitted to that device. Such an address may, for example, be an Internet Protocol (IP) address. The source node of the Route Information message may be determined by the input port at which the message is received. Alternatively, a Source Node field may be included within the Route Information message, and may be used to store an address indicating the source node of the message.

The Route Information message 36 further indicates that the cost of the route from the device that sent the message to the device identified by the Destination Node field 38 is equal to the value of the Distance field 42. Additionally, the Route Information message 36 indicates that the indicated route starts with a link associated with a layer number identified by the value of the Layer ID field 44. During operation of the disclosed system, the Route Information message 36 is sent by a node to each of its neighbors, responsive to detection of a route from the sending device to the destination device that is of either equal or lower cost than any previously used route from the sending device to the destination device.

In the alternative embodiment in which the disclosed system generates layered routes at a single predetermined node for the complete network, the Route Information message 36 further includes an indication of a Source Node associated with the Route Information message 36. The Source Node associated with the Route Information message 36 is the node that is reporting the new route to its neighbors. Also in the alternative embodiment, the Route Information message 36 further includes an indication of the neighbor node to which the message is being used to describe the new route.

Figure 3:
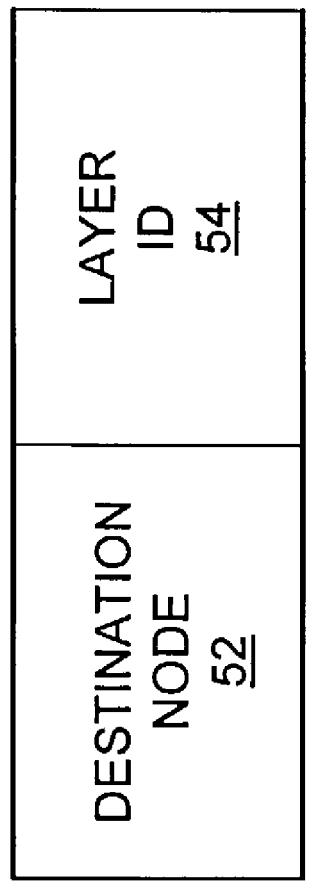
FIG. 3 shows an illustrative format for a route constrain message.

FIG. 3 shows an example of a Route Constrain message 50, as is generated, transmitted, received and processed by an alternative embodiment of the disclosed system. In the alternative embodiment using the Route Constrain message 50, multiple alternative routes may be stored within the forwarding devices of the network. The Route Constrain message 50 is transmitted by a device that wishes to limit the links used by a neighboring device to forward data to a specific destination node, in order to preserve the layered property of the routes used in the network.

For purposes of illustration, the Route Constrain message 50 of FIG. 3 is shown including a Destination Node field 52 and a Layer ID field 54. During operation of the disclosed system, a device that sends the Route Constrain message 50 has previously adopted a route to reach the destination device identified by the Destination Node field 52, in which the first outbound link is associated with a layer number indicated by the value of the Layer ID field 54. The Route Constrain message 50 is sent in response to a received Route Information message, in the event that the route described in the received Route Information message was accepted as a route to the destination device also indicated by the Route Information message. A route described in a Route Information message may be accepted if using that route would result in an equal or lower cost to reach the destination node than a previously used route, and if the new route does not violate the layered rule. In the case where the new route is accepted, a Route Constrain message may be transmitted to the sender of the Route Information message to maintain the layered property of the routes in the network.

A receiver of a Route Constrain message ensures that any route to the destination device indicated by the Destination Node field 52, and starting with a link in lower layer than that indicated by the contents of the Layer ID field, is marked "unusable". If the route described in a received Route Information message is not accepted, then there is no need to respond with a Route Constrain message.

Routes marked as "unusable" may be kept so that they do not have to be discovered again in the event that they subsequently become usable. A Route Unconstrain message may be used to remove the "unusable" indication associated with certain routes. For example, a Route Constrain message having Layer ID field 54 value of zero may be used as a Route Unconstrain message, since it removes constraints on the receiving node resulting from a previous Route Constrain message from the same source node, with regard to the indicated Destination Node. In this way a Route Constrain message having a value of zero in the Layer ID field 54 may be used to cancel the effects of a previous Route Constrain message from the same source node, and indicating the same destination device in the Destination Node field 52.

In the alternative embodiment in which the disclosed system generates layered routes at a single predetermined node for the complete network, the Route Constrain message 50 further includes an indication of a Source Node associated with the Route Constrain message 50. The Source Node associated with the Route Constrain message 50 is the node that is indicating the routing constraint to its neighbor. Also in the alternative embodiment, the Route Constrain message 50 further includes an indication of the neighbor node to which the message is being used to describe the routing constraint.

Figure 4:
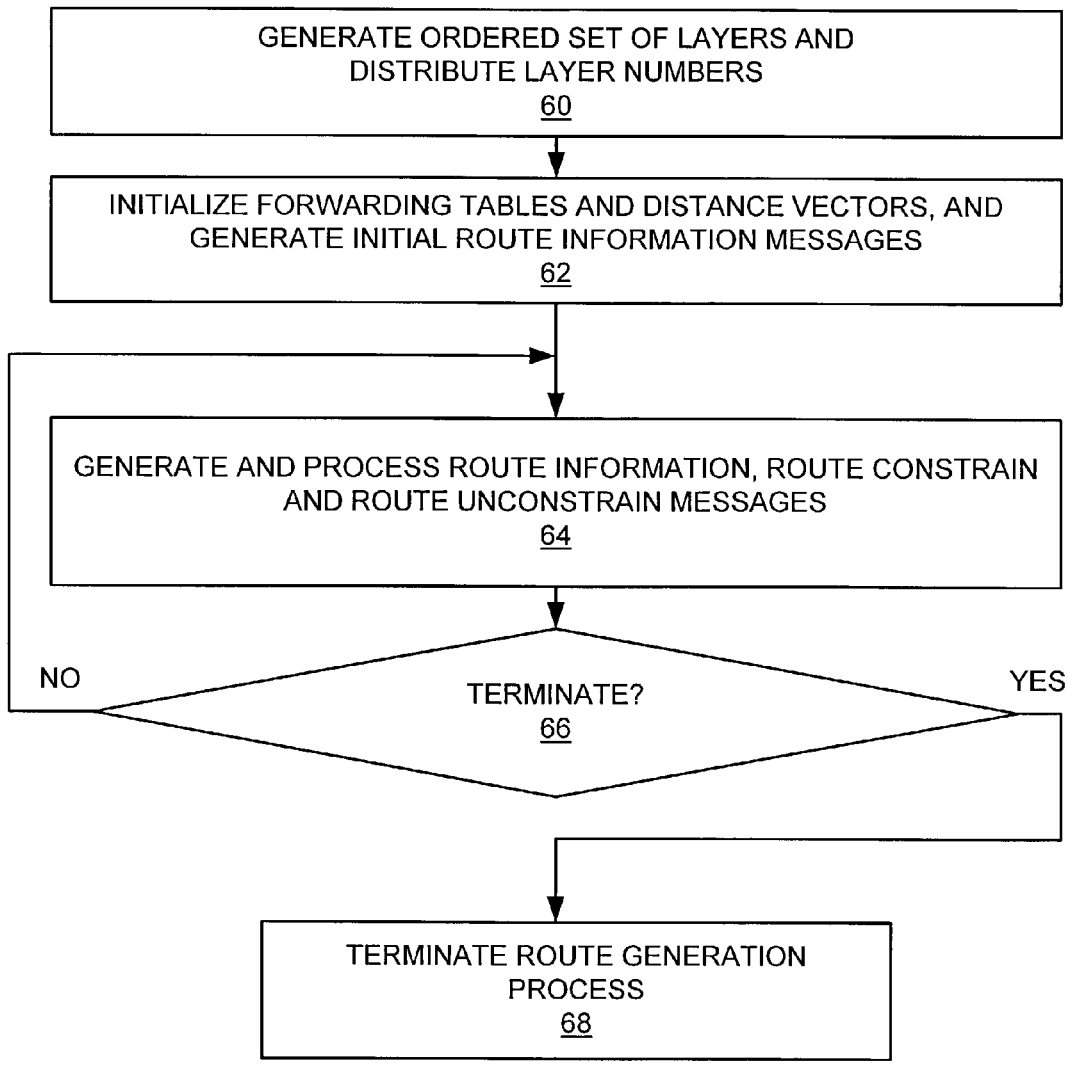
FIG. 4 is a flow chart illustrating steps performed in an illustrative embodiment to provide layered routes for a network.

FIG. 4 is a flow chart illustrating the route generation process of an embodiment of the disclosed system. At step 60, the network is partitioned into an ordered set of layers, such that each link in the network belongs to one and only one of the layers in the ordered set. Further at step 60, each forwarding device in the network is informed of the layer numbers associated with each of its inbound and outbound links. As a result, a link layer table for each forwarding device is initialized at step 60.

At step 62, forwarding tables and distance vectors within each of the forwarding devices in the network are initialized, and initial Route Information messages are transmitted, as further described below. At step 64, the forwarding devices in the network process Route Information messages, and generate, process and transmit subsequent Route Information messages. In an embodiment in which forwarding devices may store alternative routes, Route Constrain messages may also be generated, transmitted, and processed at step 64. At step 66, a determination is made as to whether a termination condition has been reached. If so, then step 66 is followed by step 68, in which the route generation process terminates. Otherwise, until a termination condition is detected at step 66, step 66 is followed by step 64, and the route generation process continues until a termination condition is detected. At step 68, the disclosed system will not necessarily have generated a shortest path for each node pair in the network, but the resulting routes will be such that each node will be reachable from every other node in the network.

A determination of when a termination condition has occurred may be done in several ways. For example, network nodes may keep track of idle time, in which no Route Information messages are received. If a node does not receive any new Route Information messages within a pre-determined period of time, then the route generation process is assumed to be complete, and a termination condition has occurred. Alternatively, a central termination decree may be employed. For example, a network manager with access to global information regarding the state of messages in the network can determine when the process has completed and inform all of the network nodes that completion has occurred.

In any case, the deadlock-free property of the resulting set of routes generated by the disclosed system depends on the successful delivery and processing of all Route Information and Route Constrain messages generated in step 64. Accordingly, the forwarding devices in the network continue processing Route Information and/or Route Constrain messages at step 64 until there are no more such messages in the network. The termination condition detected at step 66 must therefore correctly indicate that there are no Route Information or Route Constrain messages in the network that have not been successfully received and completely processed. A correct determination that there are no further messages to be processed, for example, may be obtained conveniently in an embodiment in which there is an underlying, reliable transport protocol that guarantees delivery of Route Information and Route Constrain messages. Alternatively, in an embodiment in which there is no underlying reliable transport protocol between the nodes of the network, the disclosed system may provide its own reliability guarantees through the following features:

(a) Each Route Information and Route Constrain message further includes a sequence number, and (b) Additional control messages (Route Information Acknowledgement and Route Constrain Acknowledgement) are used to acknowledge the successful receipt of Route Information and Route Constrain messages. Associations between acknowledgements and original messages are accomplished by including the sequence number of the messages being acknowledged in the acknowledgements.

In a further enhancement, fields may be added to the Route Constrain message in order to piggy-back the Route Information Acknowledgement message onto the Route Constrain message, in order to conserve bandwidth. In the event that a sender of a Route Information or Route Constrain message does not receive a corresponding acknowledgement, either as a separate message or piggy-backed onto another message, within a certain period of time following transmission of the original message, then the original message is resent. In the event that a predetermined number of retries fail to result in an acknowledgement, then the destination device is considered unavailable.

In the alternative embodiment in which layered routes are generated at a single predetermined node, and then distributed throughout the network, the layered representation of the network generated at step 60 is used by the single predetermined node that is responsible for generating and distributing the layered routes. The predetermined node performs step 62 for each node in the network, and puts all initial Route Information messages generated at step 62 into a processing queue. Further in this alternative embodiment, at step 64, the predetermined node dequeues and processes messages from the processing queue, and generates further messages, consisting of Route Information, Route Constrain, and Route Unconstrain messages, that are also put onto the processing queue, and later dequeued for processing. When all messages have been generated and processed, the alternative embodiment distributes the generated routes to the nodes of the network, for example in the form of forwarding tables, and terminates. Additionally, in the alternative embodiment in which the steps of FIG. 4 are performed at a single predetermined node, each message is also provided with an indication of a source node associated with the message, as well as a neighbor node of the source node to which the message applies.

Figure 5:
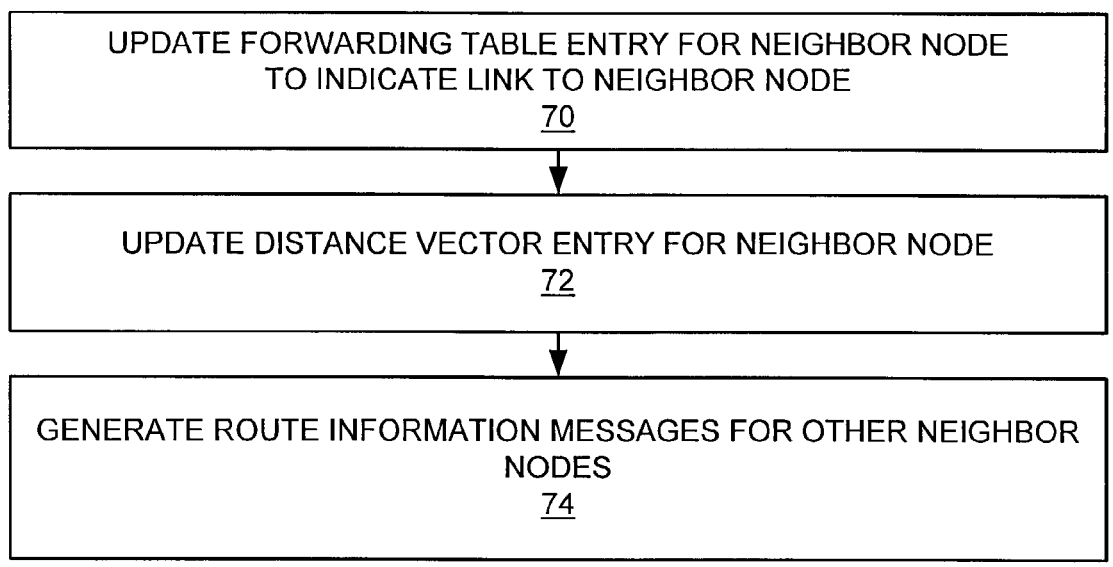
FIG. 5 is a flow chart illustrating steps performed by a device to initialize data structures and send initial route information messages.

FIG. 5 is a flow chart showing an example of steps performed in step 62 of FIG. 4. The steps of FIG. 5 are, for example, performed by each forwarding device in the network. Each forwarding device performs a series of steps with regard to each of its neighbor nodes. For example, a forwarding device i operates to perform the series of steps shown in FIG. 5 for each of its neighbor nodes j. At step 70, the forwarding device i updates its forwarding table F such that the forwarding table entry F_j, which stores routing information describing at least one link onto which data units are to be forwarded to reach the neighbor node j, indicates a link connecting the forwarding device i to the neighbor node j. Next, at step 72 of FIG. 5, the forwarding device i updates an entry associated with the neighbor node j in a distance vector D. For example, a distance vector D includes entries associated with each other node in the network, describing the distance, or number of links, between the forwarding device and the associated node using an associated route. At step 72, the forwarding device i updates the entry D_j in the distance vector D to indicate a value of 1, reflecting the single link traversed to reach the neighbor node j. At step 74, a Route Information message is generated by the forwarding device i, in which the source of the Route Information message is forwarding device i, the value of the Destination Node field indicates the neighbor node j, the value of the Distance field is equal to 1, and the value of the Layer ID field indicates the number of the layer associated with the link between forwarding device i and the neighbor device j. The Route Information message is then sent by the forwarding device i to each of its neighbor nodes other than the neighbor node j.

In the alternative embodiment in which the disclosed system generates the layered routes at a single predetermined node of the network, the steps of FIG. 5 are performed at the single predetermined node for each node of the network. Additionally, instead of transmitting the Route Information messages at step 74, the alternative embodiment would put the Route Information messages onto the processing queue after they were generated at step 74.

Figure 6:
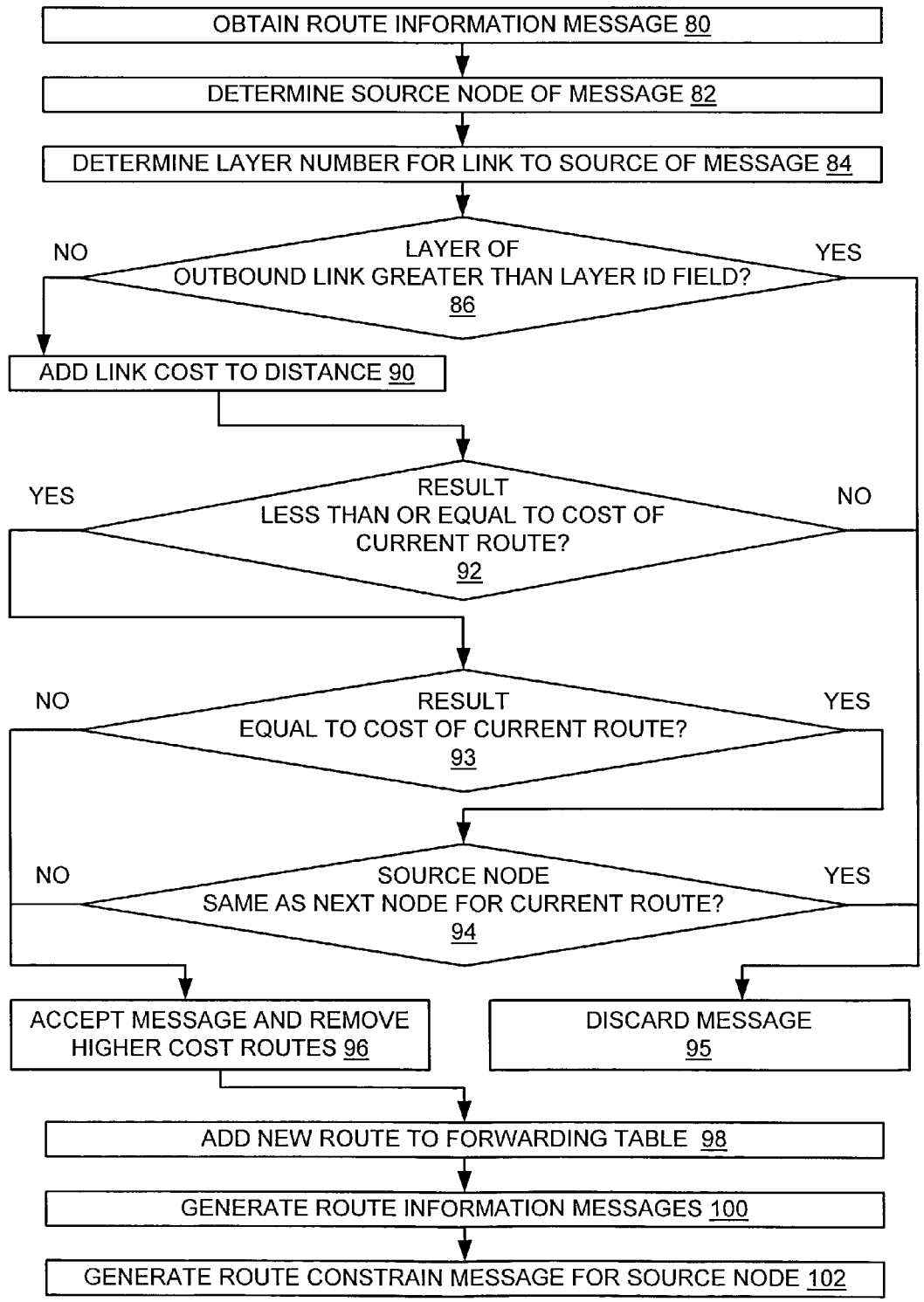
FIG. 6 is a flow chart illustrating steps performed by a device in response to receipt of a route information message.

FIG. 6 is a flow chart showing steps performed by a forwarding device, for example a forwarding device i, to process a Route Information message. At step 80, the forwarding device receives or otherwise obtains the Route Information message. At step 82 the forwarding device determines the source of the Route Information message, for example by determining an input port on which the Route Information message was received, or by reading the contents of a source node field within the Route Information message. Further at step 82, the forwarding device generates a value k representing the source of the Route Information message. Then, at step 84, the forwarding device i determines the value of its link layer table entry L_ik, indicating the layer number of the link between the forwarding device i and the source k of the Route Information message. At step 86, the forwarding device i compares the value of L_ik with the value in the Layer ID field of the received Route Information message. If the value of L_ik is greater than the value of the Layer ID field in the received Route Information message, then step 86 is followed by step 95, in which the received Route Information message is discarded. Otherwise, step 86 is followed by step 90, in which the cost of the link between the forwarding device i and the source node of the Route Information message is added to the value of the Distance field in the received Route Information message.

At step 92, the result of the addition in step 90 is compared with a cost of a current route to the Destination Node indicated by the Route Information message. The cost of the current route to the Destination Node may, for example be stored in an entry associated with the Destination Node in a distance vector in the forwarding device i. In the event that the result of the addition in step 90 is greater than the cost of the current route to the Destination Node, then step 92 is followed by step 95, in which the Route Information message is discarded.

If the result of the addition in step 90 is not greater than the cost of a current route to the Destination Node, then step 92 is followed by step 93. Otherwise, step 92 is followed by step 95, in which the Route information message is discarded.

At step 93, the forwarding device i determines whether the result of the addition in step 90 is equal in cost to a current route to the Destination node. If not, step 93 is followed by step 96. If so, then step 93 is followed by step 94, in which the forwarding device i determines whether the source of the Route Information message is the same as the device that is the next node of the current route to the Destination Node. Otherwise, step 93 is followed by step 96. If, at step 94, the forwarding device determines that the source of the Route Information message is the same as the device that is the next node of the current route to the Destination Node, then the Route Information is considered a duplicate and discarded at step 95. Otherwise, step 94 is followed by step 96.

In step 96, the Route Information message is accepted, and the forwarding device i removes all higher cost routes to the Destination Node, for example by clearing such higher cost routes from the forwarding table. Further for each higher cost route to the Destination Node that is removed at step 96, the forwarding device i sends a Route Unconstrain message indicating the Destination Node to each of the next hop devices of the removed routes.

At step 98, the forwarding device i adds the new route to its forwarding table, for example by entering an indication of the link over which the Route Information message was received into a forwarding table entry associated with the Destination Node. Next at step 100, the forwarding device i sends Route Information messages to each of its neighbor nodes other than the source of the Route Information message received at step 80. The Route Information messages sent at step 100 include a Destination Node field indicating the Destination Node from the Routing Information message received at step 80, a Distance field value equal to the result of the addition step 90, and a Layer ID field value equal to the layer number of the link between the forwarding device i and the Source Node of the Route Information message received at step 80.

Next, at step 102 the forwarding device i sends a Route Constrain message to the source of the Route Information message received at step 80. The Route Constrain message transmitted at step 102 includes a Destination Node field value equal to the Destination Node field value of the Route Information message received at step 80, and a Layer ID value equal to the layer associated with the link connecting the forwarding device i to the source of the Route Information message received at step 80.

In the alternative embodiment in which the disclosed system generates layered routes at a single predetermined node for the complete network, the steps of FIG. 6 are performed at the predetermined node in response to dequeueing of a Route Information message from the processing queue in the predetermined node. Additionally, the messages generated in the steps of FIG. 6 are enqueued to the processing queue within the predetermined node of the alternative embodiment, for subsequent dequeuing and processing.

Figure 7:
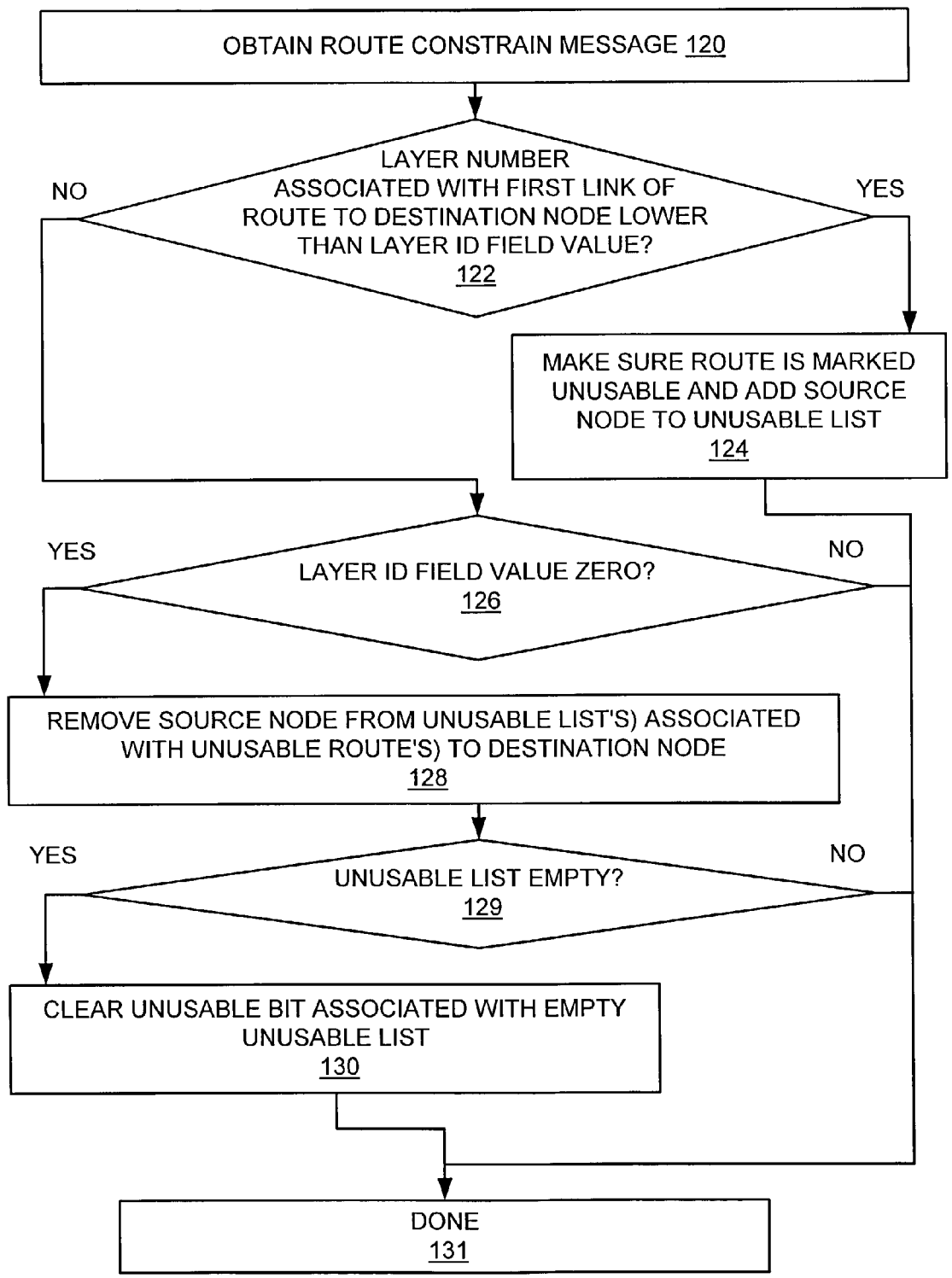
FIG. 7 is a flow chart illustrating steps performed by a device in response to receipt of a route constrain message.

FIG. 7 is a flow chart illustrating steps performed by a forwarding device in response to receiving a Route Constrain message. At step 120, a Route Constrain message is received, for example by a forwarding device i. For the current route or routes used by the forwarding device i to the node indicated by the Destination Node field of the Route Constrain message, the layer number of the first link is compared with the value of the Layer ID field of the Route Constrain message at step 122. If the first link of an existing route to the Destination Node is associated with a layer having a number less than the layer number indicated by the Layer ID field of the Route Constrain message, then step 122 is followed by step 124. At step 124, the receiving device determines whether an "unusable" bit has been set for the existing route or routes to the Destination Node having first links associated with layer numbers less that the Layer ID field contents. An unusable bit is set in association with each such existing route that does not currently have an unusable bit set. Further at step 124, the receiving device also stores an identifier of the source node of the Route Constrain message in an unusable list associated with each unusable bit for the existing route or routes to the Destination Node having first links associated with layer numbers less that the Layer ID field contents. If an unusable bit had previously been clear, then the identifier of the source node of the Route Constrain message is the first entry in the list. If an unusable bit had previously been set, then the identifier of the source node of the Route Constrain message is added to the node identifiers already in the list. The source node of the Route Constrain message may be determined in a variety of ways. For example, the link or port on which the Route Constrain message was received may serve to identify the source node, and accordingly a number associated with that link or port may be used to identify the source node of the Route Constrain message. Alternatively, an address such as that used as a destination or source address in messages may be used to identify the source of the Route Constrain message, for example an IP (Internet Protocol) address.

At step 126, a determination is made as to whether the Layer ID field of the Route Constrain message is 0. If so, then at step 128 the receiving node removes the identifier of the source node of the Route Constrain message from the unusable list associated with each route to the Destination Node indicated by the Route Constrain message. Next, at step 129, the receiving device determines whether any of the unusable lists associated with routes to the Destination Node indicated by the Route Constrain message have become empty as a result of step 128. If so, then at step 130 the unusable bits associated with those routes are cleared, and they can again be used to carry traffic. At step 131, the receive processing of the Route Constrain message is complete. As illustrated by the steps in FIG. 7, the disclosed system maintains routes that are unusable until the use of such routes will not violate the layered rule for any route.

Certain other features may be included in the disclosed system to improve efficiency, in the case where the layer numbers associated with incoming links are known. For example, based on the layer number of an incoming link, a node can suppress transmission of those Route Information messages in which the value of the Layer ID field is greater than the layer number of the incoming link from the neighbor to which the Route Information would be sent. Such an approach removes the need for a receiver of a Route Information message to compare the Layer ID value from the message with the layer number of the link to the sender of the Route Information message, and saves bandwidth by eliminating unnecessary message transmissions.

In an embodiment in which there is no need to maintain alternative equal cost routes, Route Constrain messages are not needed, unless there is a need to acknowledge receipt of the Route Information message to support reliable message delivery. In such an embodiment, each node simply keeps only one route for each destination, and advertises that route to its neighbors in the Route Information messages.

In the alternative embodiment in which the disclosed system operates to generate layered routes at a singled predetermined node, the steps of FIG. 7 are performed at the predetermined node in response to dequeueing of a Route Constrain message from the processing queue in the predetermined node. In such an embodiment, the disclosed system operates without transmitting Route Information or Route Constrain messages. Instead, the messages are enqueued to the processing queue for processing. Upon complete generation of a central routing table including layered routes between all node pairs in the network, the forwarding tables relevant to each node are transmitted to the network nodes. Additionally, in the alternative embodiment in which layered routes are generated at a single predetermined node, unusable bits and unusable lists need not be used. For example, all alternative routes may be generated in a first pass, including routes which would potentially cause deadlock because they violate the layered rule. In a second pass, the alternative embodiment of the disclosed system operates to determine which of the alternative routes generated by the predetermined node violate the layered rule, and removes those routes. The remaining set of layered routes is then distributed to the nodes in the network, for example in the form of forwarding tables.

Figure 8:
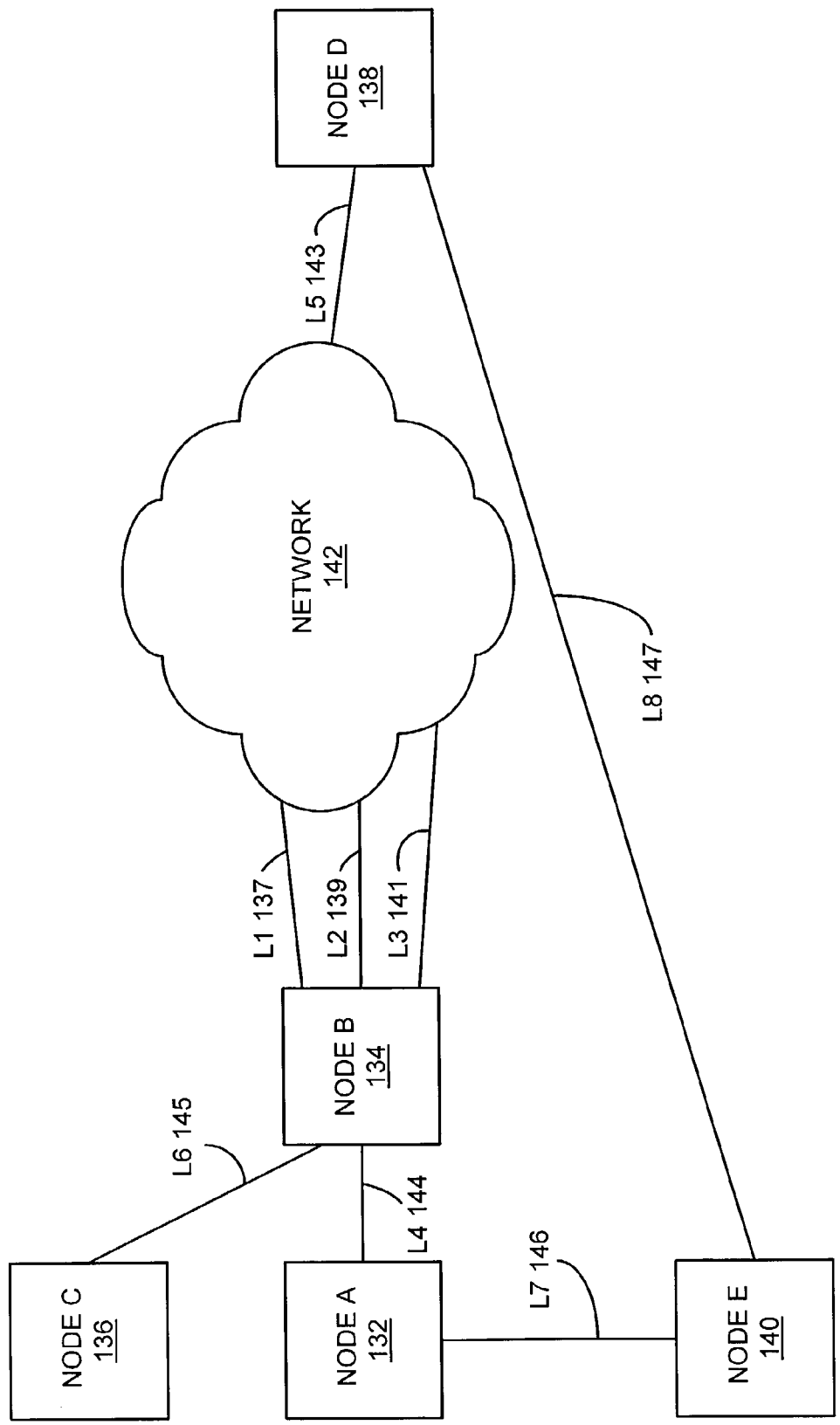
FIG. 8 illustrates a network of nodes for which the disclosed system provides routes.

FIG. 8 shows a network of nodes for which the disclosed system may operate to generate layered routes. As shown in FIG. 8, Node B 134 is communicable with Node D 138 through a Network 142, by way of links L1 137, L2 139 and L3 141 to the Network 142. The link from the Network 142 to Node D 138 is shown as link L5 143. Node A 132 is shown connected to Node B 134 via link L4 144, Node C 136 is shown connected to Node B 134 by link L6 145, Node A 132 is shown connected to Node E 140 by link L7 146, and Node E 140 is shown connected to Node D 138 by link L8 147. For purposes of example, link L1 is associated with layer 5, link L2 is associated with layer 2, link L3 is associated with layer 1, and link L4 is associated with layer 4 of a layered representation of the network shown in FIG. 8.

In order to provide an example of the operation of the disclosed system, a series of events involving the devices of FIG. 8 is now described. At a first point in time, Node B 134 determines that link L3 141 may be used to reach Node D 138. Accordingly, Node B 134 sends a Route Information message to Node A 132, informing Node A 132 that Node D 138 can be reached through Node B 134 by way of a link associated with layer 1 of the layered representation of the network. Node A 132 rejects the Route Information message, since the link L4 144 from Node A 132 to Node B 134 is associated with layer 4, and use of link L3 141 (associated with layer 1) after link L4 144 in a route to Node D 138 would violate the layered rule.

Node B 134 subsequently discovers that Node D 138 can be reached through link L2 139, and sends a Route Information message to Node A 132 describing that route. Again, Node A 132 would reject the Route Information message, since link L2 139 is associated with layer 2, which is in a lower layer than the link L4 144 between Node A 132 and Node B 134. Accordingly, a route to Node D 138 in which link L4 144 was followed by link L2 139 would also violate the layered rule.

Next, Node B 134 discovers that Node D 138 can be reached using a route beginning with link L1 137, and sends a Route Information message to Node A 132 describing the route. In this case, Node A 132 accepts the route described by the Route Information message, since link L1 137 is in a higher layer than link L4 144, and accordingly the resulting route to Node D 138 does not violate the layered rule. Node A 132 then sends a Route Constrain message to Node B 134 with a Layer ID field indicating layer 4 and a Destination Node field indicating Node D 138. In response to the Route Constrain message, Node B 134 marks links L3 141 and L2 139 as unusable for traffic going to Node D 138, and puts an identifier associated with Node A 132 into an unusable list associated with traffic to Node D 138 over link L2 139, and an unusable list associated with traffic to Node D 138 over link L3 141. In this way Node B 134 ensures that the layered rule is not violated by messages being transmitted through Node B 134 to Node D 138.

At a later point in time, Node C 136 sends a Route Constrain message to Node B 134, with a Layer ID field indicating layer 2 and a Destination Node field indicating Node D 138. As a result, Node B 134 adds an identifier associated with Node C 136 into the unusable list associated with traffic to Node D 138 over link L3 141. The unusable list for traffic to Node D 138 over link L3 141 then contains identifiers associated with Node C 136 and Node A 132.

When node E 140 subsequently sends a Route Information message to Node A 132 informing Node A 132 that Node E 140 can reach Node D 138 using link L8 147, where L8 147 is associated with a layer equal to or greater than layer 4, Node A 132 will determine whether the new route would be less costly than the route to Node D 138 through Node B 134. In the case where the new route through Node E 140 to Node D 138 would be cheaper than the route through Node B 134, Node A 132 would accept the Route Information message and adopt the new route for traffic to Node D 138. In such a case, Node A 132 would send a Route Unconstrain message indicating Node D 138 to Node B 134. Node B 134 would process the Route Unconstrain message by removing identifiers associated with Node A 132 from any unusable lists associated with traffic to Node D 138. Accordingly, Node B 134 would remove the identifier associated with Node A 132 from the unusable list associated with traffic to Node D 138 over link L3 141, and from the unusable list associated with traffic to Node D 138 over link L2 139. As a result, the unusable list associated with traffic to Node D 138 over link L2 139 would be empty, and Node B 134 would clear the unusable bit associated with traffic to Node D 138 over link L2 139. Consequently, link L2 139 would then be available as an alternative route for traffic to Node D 138 received by Node B 134 from Node C 136.

Figure 9:
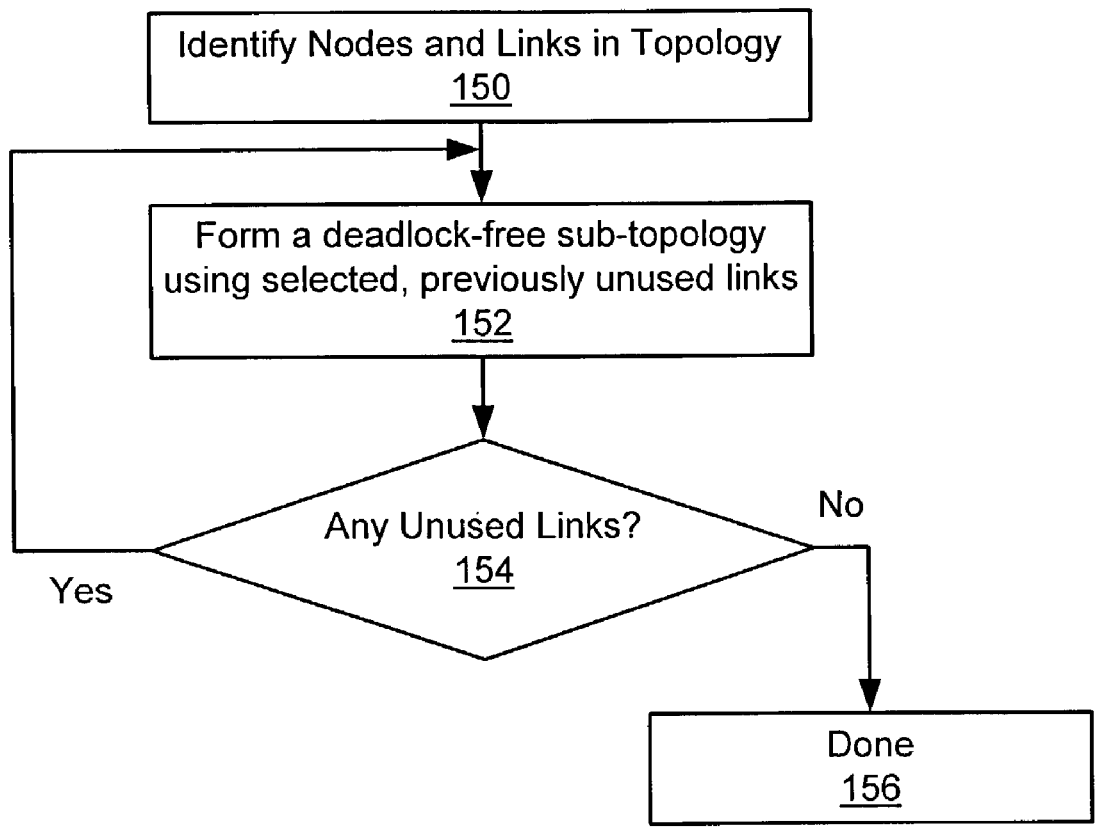
FIG. 9 is a flow chart showing steps performed in an illustrative embodiment to generate an ordered set of deadlock-free layers.

FIG. 9 shows a series of steps performed in an illustrative embodiment to partition a network into an ordered set of layers. As shown in FIG. 9, at step 150, the disclosed system first identifies those nodes and links that form the network to be processed. The nodes of the network may, for example, consist of various internetworking devices, such as those devices conventionally referred to as switches. The links of the network may consist of any type of communications link suitable for interconnecting the nodes of the network.

At step 152 of FIG. 9, the disclosed system forms a layer consisting of a deadlock-free sub-topology of the network being processed. The layer formed at step 152 may be any kind of deadlock-free sub-topology of the network. The links used to form a layer during step 152 are considered to be "used", and therefore unavailable for use in any other layer. Accordingly, each layer formed at step 152 consists of "unused" links with respect to any other layer.

Subsequent to step 152, at step 154, the disclosed system determines whether there are any links in the network that remain unused. If not, then step 154 is followed by step 156, since the system has completed formation of all layers. If so, then step 152 is repeated until each link in the network has been used within one layer. In the case where the network contains multiple links between nodes, the disclosed system may repeat steps 152 and 154 either until each link in the topology has been used within a layer, or until a predetermined number of layers have been formed. Similarly, where the network includes virtual channels over which paths may be established, then the disclosed system may repeat steps 152 and 154 either until all virtual channels have been used within the ordered set of layers, or until a predetermined number of layers have been formed.

The layers formed during step 152 may be spanning trees, or any other type of deadlock-free sub-topology of the network. Other specific types of deadlock-free sub-topologies may be employed, such as a sub-topology consisting of a number of paths determined using an up/down routing approach. The process of successively forming deadlock-free layers using unused links continues until either all possible deadlock-free layers have been formed, or until a predetermined number of deadlock-free layers have been formed. In one embodiment, when insufficient unused links remain to connect all nodes of the network, more layers may be formed consisting of deadlock-free sub-topologies that include as many of the remaining links as possible without forming any loops. Such non-spanning tree sub-topologies may be thought of as disconnected groups of trees, and are referred to herein as "forests".

The disclosed system may form a spanning tree as one or more of the layers in the ordered set of layers. Such a spanning tree may be formed using a conventional approach applied to those links available for use in any given layer. For example, Kruskal's algorithm may be applied to the remaining links at any layer in order to determine a spanning tree. As it is generally known, Kruskal's algorithm operates by maintaining a set of partial minimum spanning trees, and repeatedly adding the least costly, i.e. shortest, link in the network which connects nodes that are in different partial minimum spanning trees. A pseudo-random number generator may be used to break ties in the case of equal cost links. Other methods of obtaining spanning trees may be used in addition or in the alternative. For example, methods based on Prim's algorithm, which builds upon a single partial minimum spanning tree, at each step adding an edge connecting the vertex nearest to but not already in the current partial minimum spanning tree, may be used.

Following the steps shown in FIG. 9, the disclosed system determines an ordering for the layers that have been formed. The specific ordering of the layers may be determined in any way. For example, the ordering used may be based on the order in which the layers were formed, during the steps shown in FIG. 9. However, this is only one example of how an ordering may be provided to the set of deadlock-free layers, and any other arbitrary system of ordering may be provided in the alternative. The resulting ordered set of layers is then made available to the nodes of the network that participate in the disclosed distributed route generation process, so that they can associate layer numbers with each of their inbound and outbound links.

Figure 10:
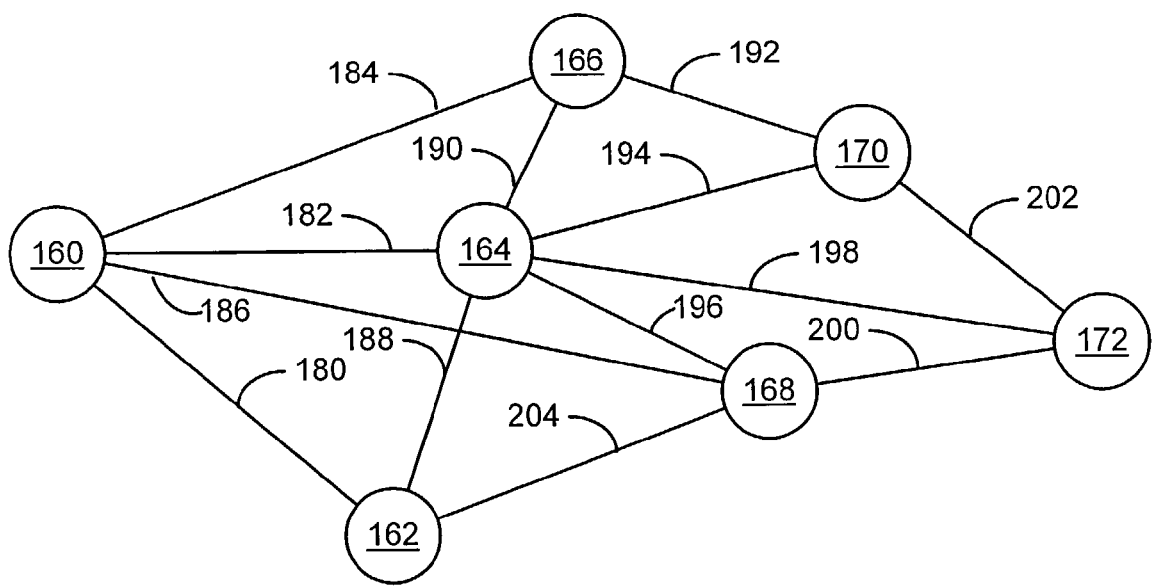
FIG. 10 shows a network including a number of nodes and links between nodes.

FIG. 10 shows an illustrative network for purposes of discussion that includes a number of nodes and links between nodes. The nodes shown in FIG. 10 may comprise any kind of networking devices, such as routers or switches. The links of FIG. 10 may be any kind of communications link, such as electrically conductive, fiber optic, wireless, or virtual channels. As shown in FIG. 10, a set of nodes 160, 162, 164, 166, 168, 170, 172 are interconnected by a set of links 180, 182, 184, 186, 188, 190, 192, 194, 196, 198, 200, 202, and 204.

Figure 11:
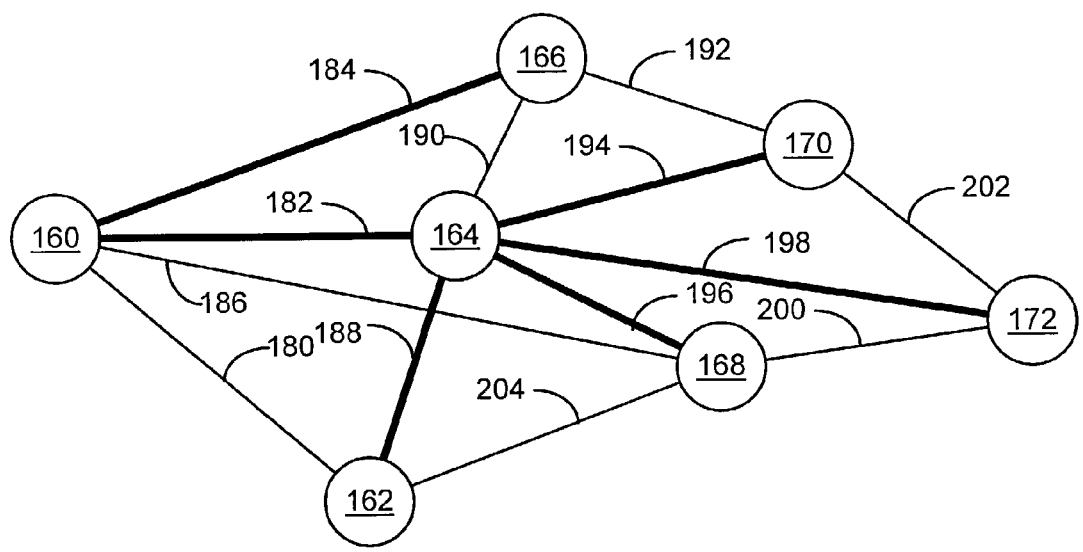
FIG. 11 shows an example of an initial deadlock-free sub-topology layer of the network shown in FIG. 10.
Figure 12:
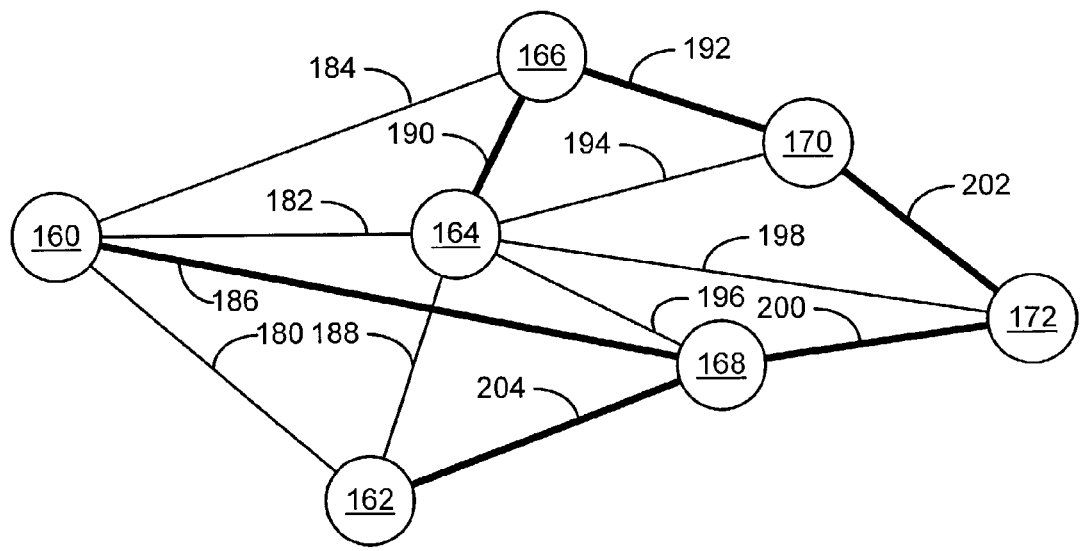
FIG. 12 shows an example of a second deadlock-free sub-topology layer of the network shown in FIG. 10.

FIG. 11 illustrates an initial layer formed by the disclosed system. The initial layer shown in FIG. 11 is a spanning tree for the network shown in FIG. 10, and includes the links 182, 184, 188, 194, 196 and 198. The layer shown in FIG. 11 is referred to as layer 1 with respect to the network shown in FIG. 10. FIG. 12 shows a second layer (layer 2), which is a spanning tree utilizing links from the network of FIG. 10 which were not used in the layer 1 as illustrated in FIG. 11. The layer 2 shown in FIG. 12 includes the links 186, 190, 192, 200, 202 and 204.

Figure 13:
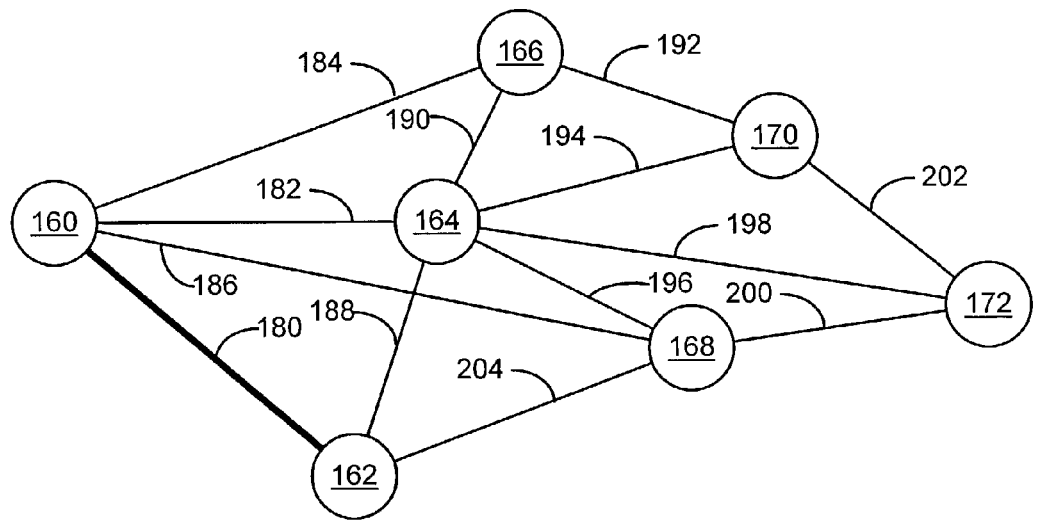
FIG. 13 shows an example of a third deadlock-free sub-topology layer of the network shown in FIG. 10.

FIG. 13 shows an example of a third deadlock-free layer with respect to the network shown in FIG. 10. As shown in FIG. 13, layer 3 includes the link 180, which is the only remaining link that is unused following the formation of the layers shown in FIGS. 11 and 12. Thus the layer shown in FIG. 13 is an example of a non-spanning tree layer, also referred to as a forest.

Figure 14:
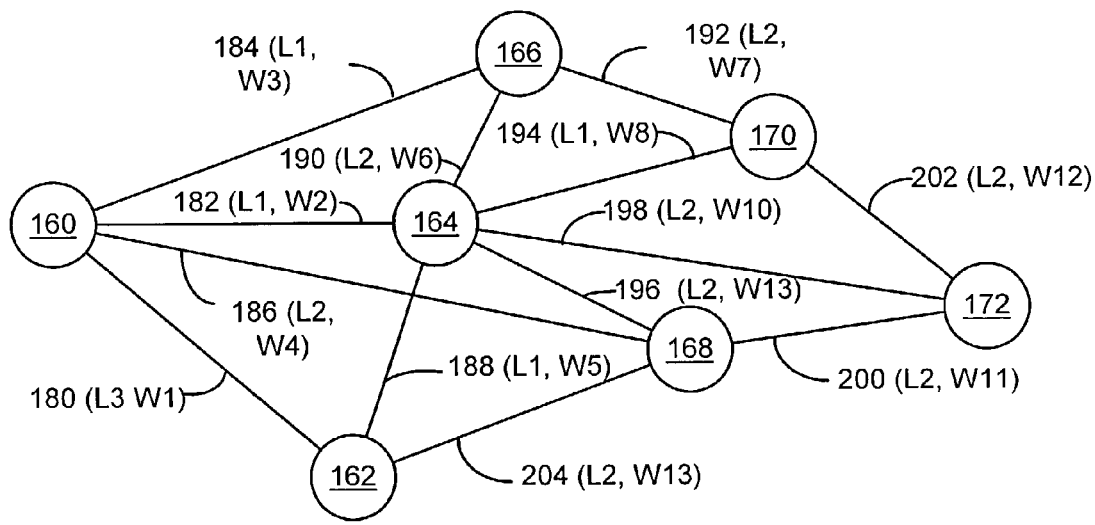
FIG. 14 shows the network of FIG. 10 with layer assignments associated with the links according to the layers shown in FIGS. 11–13.

FIG. 14 shows the network of FIG. 10 with layer assignments associated with the links according to the layers shown in FIGS. 11-13. As shown in FIG. 14, e.g., link 180 is associated with layer L3 and a weight W1 (L3, W1). The other links are similarly labeled. The weights and layers shown associated with the links of the network in FIG. 14 may be used to determine the routes between the nodes in the network. The weights associated with each link indicate a cost associated with that link.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the above described methods and system may be made without departing from the inventive concepts herein disclosed. Accordingly, the invention should not be viewed as limited except by the scope and spirit of the appended claims.

What is claimed is:

1. A method for generating routes in a communication network having a plurality of nodes connected by a plurality of links, comprising:
    generating an ordered set of layers, each of said layers including a subset of the links in said communication network, each of said layers associated with a layer number indicating an associated position in said ordered set of layers;
    in a first node, determining an outgoing link to a destination node;
    determining a layer number associated with said outgoing link to said destination node;
    generating in said first node a route information message, wherein said route information message identifies said destination node and said layer number; and
    sending said route information message from said first node to at least one neighbor node other than said destination node over a link that differs from said outgoing link.

2. The method of claim 1 wherein said route information message further indicates said at least one neighbor node other than said destination node.

3. The method of claim 1, wherein said route information message further indicates a source node associated with said route information message.

4. The method of claim 1, further comprising placing said route information message onto a processing queue.

5. The method of claim 1, wherein said route information message further comprises a distance value indicating a cost associated with said link to said destination node.

6. The method of claim 3, wherein said source node is a node sending said route information message.

7. The method of claim 1, further comprising:
    obtaining a subsequent route information message;
    determining a source node associated with said subsequent route information message;
    extracting a layer number from said subsequent route information message;
    determining a layer number associated with a link to said source node;
    comparing said layer number associated with said link to said source node with said layer number extracted from said subsequent route information message; and
    rejecting said subsequent route information message in the event that said layer number associated with said link to said source node is greater than said layer number extracted from said subsequent route information message.

8. The method of claim 7, further comprising:
    in the event that said layer number associated with said link to said source node is not greater than said layer number extracted from said subsequent route information message, performing the following steps
    adding a distance value from said subsequent route information message to a cost associated with said link to said source node to generate a result,
    comparing said result with a current cost associated with a current route to a destination node indicated by said subsequent route information message, and in the event that said result is greater than said cost associated with said current route to said destination node indicated by said subsequent route information message, rejecting said route information message.

9. The method of claim 8, further comprising:
    in the event that said result is less than said cost associated with said current route to said destination node indicated by said subsequent route information message, accepting said subsequent route information message, wherein said accepting includes
    removing indication of at least one higher cost previous route to said destination node indicated by said subsequent route information message, and storing indication of said link to said source node as an initial portion of a route to said destination node indicated by said subsequent route information message.

10. The method of claim 8, further comprising:
in the event that said result is not greater than said cost associated with said current route to said destination node indicated by said subsequent route information message, accepting said subsequent route information message, wherein said accepting includes sending a route constrain message to said source node, wherein said route constrain message includes a link layer number field indicating said link layer number associated with said link to said source node and said destination node indicated by said subsequent route information message.

11. The method of claim 8, further comprising:
in the event that said result is not greater than said cost associated with said current route to said destination node indicated by said subsequent route information message, accepting said subsequent route information message, wherein said accepting includes
generating at least one new route information message, wherein said new route information message includes indication of said destination node indicated by said subsequent route information message, a distance value equal to said result, and an indication of said layer number associated with said link to said source node, and
sending said at least one new route information message to at least one neighbor node other than said source node.

12. The method of claim 1, further comprising:
receiving a route constrain message, wherein said route constrain message indicates a destination node and a layer number;
marking at least one route to said destination node indicated by said route constrain message having a first link associated with a layer number lower than said layer number indicated by said route constrain message as unusable; and
storing indication of a source node associated with said route constrain message in an unusable list associated with route to said destination node indicated by said route constrain message having a first link associated with a layer number lower than said layer number indicated by said route constrain message.

13. The method of claim 12, further comprising:
receiving a route unconstrain message, wherein said route unconstrain message indicates said destination node;
removing said stored indication of said source node from said unusable list;
determining whether said unusable list is empty; and
responsive to a determination that said unusable list is empty, removing said marking of said at least one route to said destination node indicated by said route constrain message as unusable.

14. A system for generating routing information for devices in a communication network having a plurality of nodes connected by a plurality of links, comprising:
route generation logic operable to
generate an ordered set of layers, each of said layers including a subset of the links in said communication network, each of said layers associated with a layer number indicating an associated position in said ordered set of layers, in a first node, determine an outgoing link to a destination node,
determine a layer number associated with said outgoing link to said destination node,
generate in said first node a route information message, wherein said route information message dentifies said destination node and said layer number; and
send said route information message from said first node to at least one neighbor node other than said destination node over a link that differs from said outgoing link.

15. The system of claim 14, wherein said route information message further indicates said at least one neighbor node other than said destination node.

16. The system of claim 14, wherein said route information message further indicates a source node associated with said route information message.

17. The system of claim 14, wherein said route generation logic is further operable to place said route information message onto a processing queue.

18. The system of claim 14, wherein said route information message further comprises a distance value indicating a cost associated with said link to said destination node.

19. The system of claim 16, wherein said source node is a node sending said route information message.

20. The system of claim 14, wherein said route generation logic is further operable to:
obtain a subsequent route information message;
determine a source node associated with said subsequent route information message;
extract a layer number from said subsequent route information message;
determine a layer number associated with a link to said source node;
compare said layer number associated with said link to said source node with said layer number extracted from said subsequent route information message; and
reject said subsequent route information message in the event that said layer number associated with said link to said source node is greater than said layer number extracted from said subsequent route information message.

21. The system of claim 20, wherein said route generation logic is further operable, in the event that said layer number associated with said link to said source node is not greater than said layer number extracted from said subsequent route information message, perform the following steps:
add a distance value from said subsequent route information message to a cost associated with said link to said source node to generate a result;
compare said result with a current cost associated with a current route to a destination node indicated by said subsequent route information message; and
in the event that said result is greater than said cost associated with said current route to said destination node indicated by said subsequent route information message, reject said route information message.

22. The system of claim 21, wherein said route generation logic is further operable, in the event that said result is less than said cost associated with said current route to said destination node indicated by said subsequent route information message, to accept said subsequent route information message by performing the following steps:
removing indication of at least one higher cost previous route to said destination node indicated by said subsequent route information message, and storing indication of said link to said source node as an initial portion of a route to said destination node indicated by said subsequent route information message.

23. The system of claim 21, wherein said route generation is further operable, in the event that said result is not greater than said cost associated with said current route to said destination node indicated by said subsequent route information message, to accept said subsequent route information message by sending a route constrain message to said source node, wherein said route constrain message includes a link layer number field indicating said link layer number associated with said link to said source node and said destination node indicated by said subsequent route information message.

24. The system of claim 21, wherein said route generation logic is further operable, in the event that said result is not greater than said cost associated with said current route to said destination node indicated by said subsequent route information message, to accept said subsequent route information message by performing the following steps:

generating at least one new route information message, wherein said new route information message includes indication of said destination node indicated by said subsequent route information message, a distance value equal to said result, and an indication of said layer number associated with said link to said source node, and sending said at least one new route information message to at least one neighbor node other than said source node.

25. The system of claim 14, wherein said route generation logic is further operable to:

receive a route constrain message, wherein said route constrain message indicates a destination node and a layer number;

mark at least one route to said destination node indicated by said route constrain message having a first link associated with a layer number lower than said layer number indicated by said route constrain message as unusable; and store indication of a source node associated with said route constrain message in an unusable list associated with route to said destination node indicated by said route constrain message having a first link associated with a layer number lower than said layer number indicated by said route constrain message.

26. The system of claim 25, wherein said route generation logic is further operable to:

receive a route unconstrain message, wherein said route unconstrain message indicates said destination node;

remove said stored indication of said source node from said unusable list;

determine whether said unusable list is empty; and responsive to a determination that said unusable list is empty, remove said marking of said at least one route to said destination node indicated by said route constrain message as unusable.

27. A system for generating routes in a communication network having a plurality of nodes connected by a plurality of links, comprising:

means for generating an ordered set of layers, each of said layers including a subset of the links in said communication network, each of said layers associated with a layer number indicating an associated position in said ordered set of layers;

in a first node, means for determining an outgoing link to a destination node;

means for determining a layer number associated with said outgoing link to said destination node;

means for generating in said first node a route information message, wherein said route information message identifies said destination node and said layer number; and means for sending said route information message from said first node to at least one neighbor node other than said destination node over a link that differs from said outgoing link.

28. A computer program product including a computer readable medium, said computer readable medium having a computer program stored thereon, said computer program for generating routing information in a communication network having a plurality of nodes connected by a plurality of links, said computer program comprising:

program code for generating an ordered set of layers, each of said layers including a subset of the links in said communication network, each of said layers associated with a layer number indicating an associated position in said ordered set of layers;

program code, operable in a first node, for determining an outgoing link to a destination node;

program code for determining a layer number associated with said outgoing link to said destination node;

program code for generating in said first node a route information message, wherein said route information message identifies said destination node and said layer number; and program code for sending said route information message from said first node to at least one neighbor node other than said destination node over a link that differs from said outgoing link.

* * * * *